United States Patent [19]

Jungvid

[11] Patent Number: 5,085,874
[45] Date of Patent: Feb. 4, 1992

[54] FEEDING-STUFF

[75] Inventor: Hans Jungvid, Veddige, Sweden

[73] Assignee: Hans Jungvid Aktiebolag, Veddige, Sweden

[21] Appl. No.: 573,303

[22] PCT Filed: Mar. 20, 1989

[86] PCT No.: PCT/SE89/00148
  § 371 Date: Sep. 25, 1990
  § 102(e) Dated: Sep. 25, 1990

[87] PCT Pub. No.: WO89/08991
  PCT Pub. Date: Oct. 5, 1989

[30] Foreign Application Priority Data

Mar. 28, 1988 [SE] Sweden ............................ 8801142

[51] Int. Cl.$^5$ ........................................... A23K 1/08
[52] U.S. Cl. ........................................ 426/41; 426/2; 426/72; 426/74; 426/656; 426/657; 426/807
[58] Field of Search .............. 426/656, 2, 41, 807, 426/72, 74, 657, 807

[56] References Cited

U.S. PATENT DOCUMENTS

| | | | |
|---|---|---|---|
| 3,868,467 | 2/1975 | Olson | 426/2 |
| 4,294,856 | 10/1981 | Kinumaki et al. | 426/7 |
| 4,362,710 | 12/1982 | Watanabe | 426/2 |
| 4,378,376 | 3/1983 | Wagner et al. | 426/41 |
| 4,600,585 | 7/1986 | Vitcenda et al. | 426/2 |
| 4,614,653 | 9/1986 | Kakade | 426/2 |
| 4,692,338 | 9/1987 | Irvine et al. | 426/2 |
| 4,961,934 | 10/1990 | Iwasaki | 426/2 |

Primary Examiner—R. B. Penland
Attorney, Agent, or Firm—Burns, Doane, Swecker & Mathis

[57] ABSTRACT

A feed-stuff for young animals, particularly piglets, to be administered during the first weeks of life and comprising starch, vitamins, and minerals, whereby it has a composition which in general resembles the composition of the mother's milk with regard to the ratio of casein to whey proteins, the lactose content has been adopted to the lactose content of the mother's milk, that the starch present is gelatinized and is substantially free of fibers and other mineral and trace substance binding carbohydrate complexes, and it contains organic, acidifying compounds to maintain a low pH in the stomach.

8 Claims, No Drawings

FEEDING-STUFF

DESCRIPTION

1. Technical Field

The present invention relates to starting feed-stuff for young animals, particularly for piglets, but also for ruminants and deer, to be added during the first weeks of their lives, typically from the age of one week to four weeks.

The object of the present invention is to obtain a starting feed-stuff intended for young animals, particularly piglets, by means of which feed-stuff, administered when the animals are one to four weeks old, only, one stimulates the animal to an early feed-stuff intake and thereby promotes the animal's own production of protein and starch reducing enzymes.

Another object of the present invention is to obtain a starting feed-stuff which by means of its composition, function and physical shape is particularly suited as a carrier for vitamins, carbohydrates, different proteins with the aim of increasing the immunological status, fat, minerals, micro nutrients, such as iron, probiotics, such as positively acting bacteria, and antibacterial substances.

A further object of the present invention is to obtain a starting feed-stuff which by means of an ideal composition and taste, without then disturbing the gastro-intestinal functions of the animals is consumed at an early stage by the piglets, whereby the affliction on the mother animal can be reduced by reduced demands for milk production, and thereby the mother animal can better maintain its body weight and nutritional-physiological status.

2. Background of the Invention

It is commonly known that piglets during their early growth and weaning period in many cases are caught by disasterous diarrhoea conditions. These conditions are many times caused by the inability of the animals to assimilate nutritional elements from the intestine whereby undigested nutrients will end up in the large intestine, where they are a substrate for undesired intestinal bacterial flora.

The total mortality including dead born piglets in Swedish and international pig breeding is today as high as 20 to 25%. Many of these piglets are also prior to their death the object of an intense care as they already at birth under weight and have e.g. iron anaemia. The lack of iron, which is caused by the rapid growth of the pig and the low content of iron in the sow milk can partly be compensated for by iron injections, but these are costly, and the effect is not particularly durable. To add adequate amounts of iron orally to the piglets at an early stage is thus a great demand, the problem is to get the piglets to consume this iron in quantities large enough, without disturbing the other gastro-intestinal functions of the animals. Adding to this is the problem that under-weight and anaemic piglets very often refuse to eat additional feed-stuff and thereby the introduction and the consumption of more iron rich feed-stuffs is further delayed. Moreover, the health status of the mother animal is further afflicted by a prolonged sucking.

Different additional feed-stuffs have been proposed to increase palatability and to increase the administration of iron via these. Thus diets based on oat flakes are often a palatable source which the piglets accepts. Oat flakes alone, however, do not provide a balanced feeding status. Moreover, the fytin content makes e.g. the iron resorption more difficult. Additional feed-stuffs based on cereal grains are thus from this point of view unsuitable as carriers of iron preparations.

DESCRIPTION OF THE PRESENT INVENTION

It has now surprisingly been found possible to be able to eliminate these problems by means of the present invention which is characterized in that the starting feed-stuff has a composition which in general resembles the composition of the mother milk with regard to the ratio of casein to whey proteins, and that the starch present is gelatinized and is substantially free of fibers and other mineral and trace substances binding carbohydrate complexes, and that it contains organic, acidifying compounds to maintain a low pH in the stomach.

The content of organic, acidifying compounds to maintain a relatively low pH in the stomach is citric acid or lactic acid or another organic acid obtained by Lactobacillus or other similar acid forming bacteria which grow on a substrate containing i.e., lactulose to promote the survival of these lactobacillae.

The starting feed-stuff should as a rule not contain any large amounts of saccharides of the type which can not be resorbed in the upper gastro-intestinal tract.

Further the feed-stuff should not contain more than 0.3% of Na.

In order to guarantee a complete resorption the feed-stuff may, if it is so deemed necessary, contain carbohydrate digesting enzymes such as cellulases, amylases, lactase, or proteolytic enzymes in order to facilitate the digestion of proteins in the intestine.

One part of the feed-stuff consists of a particular base of the feed-stuff which base is a fraction of casein and whey proteins having been digested by Lactobacillus. The digestion/acidification hereby takes place at pH 5.8 for a time period of normally 4 to 10 hrs at a temperature of 37° to 45° C.

The invention will be described more in detail with reference to the Examples given however, without being restricted thereto.

EXAMPLE 1

First a base was prepared which base consisted of
- 40% of whey
- 2% of dry yeast (proteins, nutritional salts, vitamins)
- 5-8% of sodium and/or potassium caseinate
- 50% of fat (tallow, lard, rape oil, soya oil, or a mixture thereof)
- q.s. antioxidants (to protect the fat present)

which base, with the exception for the fat content, is first subjected to a fermentation in the presence of Lactobacillus bulgaricus and Streptococcus thermophilus to pH 5.8 for a time period of 6 hrs at a temperature of 42° C. The acidified casein-whey part was spray-dried and the fat was added thereto. The fat is hereby bound into the casein-whey powder by the formation of a substantially dry base.

- 60% of the above base
- 10% of vegetable proteins (from potato or carbohydrate freed soya)
- 10% of animal protein
- 5-15% of gelatinized starch
- 1% of wheat germ
- 1% of citric acid
- 1% of lyzed yeast
- 1% of dextrose 3% premix (vitamins, minerals, trace elements, probiotics, lactulose, and carrier)

were dry mixed and shaped into granules or pellets having a size of 2 to 5 mm and a length of 3 to 10 mm.

These granules or pellets are administered ad libitum to the resting place of the piglets and have thereby turned out to be well accepted, whereby the time for introduction and consumption of the ordinary feed-stuff for piglets has been able to be made one or two weeks earlier. The result has further been a considerable reduction in the number of cases of diarrhoea. A positive lowering of the pH in the stomach at an early age has further been observed. A low pH in the stomach is important to stop unsuitable bacteria from passing through the stomach and thereby cause diarrhoea.

The iron content is preferably in the form of iron sulphate, but also other iron compounds, such as EDTA-iron can be used.

EXAMPLE 2

A feed-stuff for young calves was prepared in accordance with the following formula;

34.0% of fat (tallow, lard, rape oil, soya oil, or a mixture thereof)
2.0% of starch
27.0% of skim milk powder
18.0% of desalted whey powder
11.5% of Na-caseinate
6.0% of potato protein
1.5% of premix of vitamins and minerals The ingredients were carefully mixed and pelletized. The final feed-stuff contains 32% of protein, 35% of fat, 20% of lactose, and 0% of fibers.

The feed-stuff may not be pelletized if the animals are very young as the feed-stuff can then be added in the form of an aqueous suspension to a dry solids content of 12%.

EXAMPLE 3

A feed-stuff for young deer was prepared in accordance with the following formula:

24.0% of fat (tallow, lard, rape oil, soya oil or a mixture thereof)
12.5% of skim milk powder
20.5% of egg yolk powder
26.0% of desalted whey
2.0% of starch
14.0% of Na-caseinate
1.0% of premix of vitamins and minerals The ingredients were carefully mixed and pelletized. The composition of the feed-stuff was 32% of proteins, 36% of fat, 15% of lactose, and 0% of fibers.

The feed-stuff for young deer need not necessarily be pelletized but can be administered as a powder suspended in water at a dry solids contents of 20%.

I claim:

1. A starting feed-stuff for administration to young animals selected from the group consisting of piglets, ruminants, and deer during the first weeks of life consisting essentially of 18 to 26% by weight of whey, 3 to 8.5% by weight of casein, 30 to 36% by weight of fat, 6 to 10% by weight of vegetable protein, 10 to 32% by weight of animal protein, 2 to 15% by weight of pregelatinized starch wherein the starch is substantially free from fibres and other carbohydrate complexes that bind iron, 1% of organic acid, 1% by weight of lyzed yeast, 1% by weight of dextrose, and 1.5 to 3% by weight of vitamins and minerals wherein the lactose level of the feed-stuff is substantially the lactose level in milk from the mother of the young animal and wherein the ratio of casein to whey proteins is substantially the ratio in milk from the mother of the young animal.

2. The starting feed-stuff of claim 1 wherein the casein and whey are present in the form of a product which has been fermented with lactic acid-producing bacteria and spray dried.

3. The starting feed-stuff of claim 2 wherein the product has been fermented with Lactobacillus bulgaricus-Streptoccocus thermophilus.

4. The starting feed-stuff of claim 3 wherein the feed-stuff is in the form of granules or pellets.

5. The starting feed-stuff of claim 2 wherein the feed-stuff is in the form of granules or pellets.

6. The starting feed-stuff of claim 1 wherein the ratio of the total weight of casein and whey to fat is 1:1.

7. The starting feed-stuff of claim 6 wherein the feed-stuff is in the form of granules or pellets.

8. The starting feed-stuff of claim 9 wherein the feed-stuff is in the form of granules or pellets.

* * * * *

UNITED STATES PATENT AND TRADEMARK OFFICE
CERTIFICATE OF CORRECTION

PATENT NO. : 5,085,874
DATED : February 4, 1992
INVENTOR(S) : Jungvid

It is certified that error appears in the above-identified patent and that said Letters Patent is hereby corrected as shown below:

In column 4, line 43, amend "9" to --1--.

Signed and Sealed this

Twentieth Day of July, 1993

Attest:

MICHAEL K. KIRK

Attesting Officer     Acting Commissioner of Patents and Trademarks